July 29, 1924.
H. F. BRUHN
ATTACHMENT FOR TRACTORS
Filed Aug. 20, 1923
1,503,348
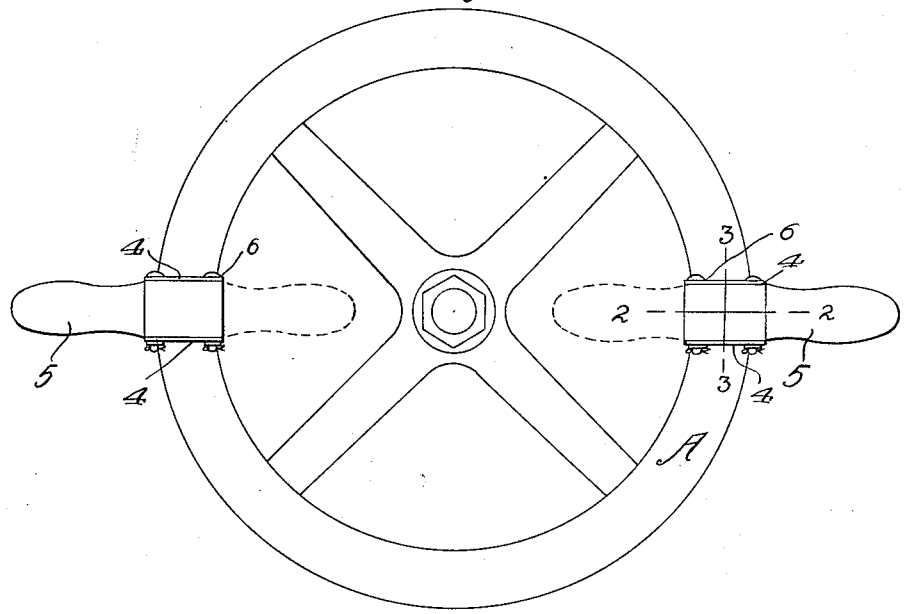
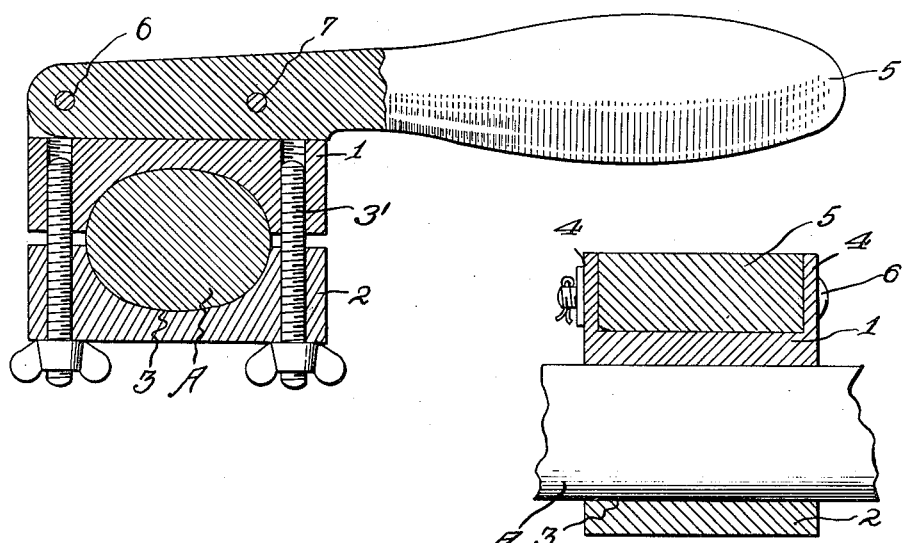
Henry F. Bruhn
INVENTOR
BY Victor J. Evans
ATTORNEY
WITNESS: M. J. Trainor Patented July 29, 1924.

1,503,348

UNITED STATES PATENT OFFICE.

HENRY F. BRUHN, OF HERNDON, KANSAS.

ATTACHMENT FOR TRACTORS.

Application filed August 20, 1923. Serial No. 658,405.

*To all whom it may concern:*

Be it known that I, HENRY F. BRUHN, a citizen of the United States, residing at Herndon, in the county of Rawlins and State of Kansas, have invented new and useful Improvements in Attachments for Tractors, of which the following is a specification.

This invention relates to an attachment for the steering wheel of motor vehicles, tractors and the like, the general object of the invention being to provide a supplemental handle which will provide greater leverage and thus make steering of the vehicle easier.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a plan view of a steering wheel showing the invention applied thereto.

Figure 2 is a section on line 2—2 of Figure 1.

Figure 3 is a section on line 3—3 of Figure 1.

In these views 1 and 2 indicate a pair of blocks which are recessed, at 3, to receive a part of the rim of the steering wheel, shown at A, between them. These blocks are bolted together by the bolts 3' and the upper block is provided with the flanges 4 at its top to which the end of the handle 5 is pivoted, as shown at 6. Holes 7 are formed in the handle and flanges so that a cotter pin or the like can be placed therein to lock the handle to the flanges. When the handle is not to be used this pin is removed and the handle swung into dotted line position so that it will be out of the way. When in use the handle will give greater leverage to the wheel so that a vehicle can be steered much easier than by using the steering wheel alone.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with a steering wheel, a pair of blocks recessed to receive a portion of the rim of the wheel between them, bolts for connecting the blocks together, flanges on the upper block, a handle pivoted to the flanges and said handle and flanges having holes therein for receiving a pin to lock the handle in operative position.

HENRY F. BRUHN.